(12) United States Patent
Wurier et al.

(10) Patent No.: US 6,209,358 B1
(45) Date of Patent: Apr. 3, 2001

(54) SEMICONTINUOUS METHOD OF DRAWING FIBERS FROM PREFORMS, THE METHOD INCLUDING A PREHEATING STEP

(75) Inventors: Bernard Wurier, Valmondois; Michel Hertz, Paris; Jean-Philippe Francois, Thônes, all of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/234,313

(22) Filed: Jan. 21, 1999

(30) Foreign Application Priority Data

Jan. 22, 1998 (FR) .................................................. 98 00651

(51) Int. Cl.$^7$ .................................................. C03B 37/02
(52) U.S. Cl. .................. 65/435; 65/435; 65/385; 65/384
(58) Field of Search .................... 65/435, 385, 384

(56) References Cited

U.S. PATENT DOCUMENTS 5,685,889 * 11/1997 Ohga ........................................ 65/384

FOREIGN PATENT DOCUMENTS

| 39 29 894 A1 | 3/1991 | (DE) . | |
| 3929894A1 * | 3/1991 | (DE) ............................ | C03B/37/012 |
| 40 14 330 A1 | 11/1991 | (DE) . | |

OTHER PUBLICATIONS

Patent Abstracts of Japan, vol. 9, No. 184 (C–294), Jul. 30, 1985 corresponding to JP 60 051630 A (Furukawa Electric Co. Ltd. et al) Mar. 23, 1985.

Patent Abstracts of Japan, vol. 12, No. 479 (C–552) Dec. 14, 1988 corresponding to JP 63 195144 A (Sumitomo Electric Ind. Ltd.) Aug. 12, 1988.

Patent Abstracts of Japan, vol. 13, No. 362 (C–625), Aug. 14, 1989 corresponding to JP 01 119541 A (Hoya Corp.) May 11, 1989.

Patent Abstracts of Japan, vol. 18, No. 61 (C–1160) Feb. 2, 1994 corresponding to JP 05 279067 A (Fujikura Ltd) Oct. 26, 1993.

Patent Abstracts of Japan, vol. 7, No. 3 9C–143) Jan. 7, 1983 corresponding to JP 57 160934 A (NT&T Corp.) Oct. 4, 1982.

* cited by examiner

*Primary Examiner*—Stanley S. Silverman
*Assistant Examiner*—Mark Halpern
(74) *Attorney, Agent, or Firm*—Sughrue, Mion, Zinn, Macpeak & Seas, PLLC

(57) ABSTRACT

In the fiber-drawing method, a first preform is lowered along a fiber-drawing axis through a fiber-drawing oven so as to be heated and drawn down into an optical fiber, and a second preform is lowered along the fiber-drawing axis through the fiber-drawing oven so as to be heated and drawn down in turn after the first preform has been withdrawn. While the first preform is being drawn down into a fiber, the second preform is heated in a preheating oven disposed adjacent to the fiber-drawing oven so as to raise the second preform to a temperature which is slightly below the fiber-drawing temperature, and the preheated second preform is transferred quickly onto the fiber-drawing axis after the first preform has been withdrawn therefrom. This method contributes to increasing the capacity for producing optical fibers.

6 Claims, 2 Drawing Sheets

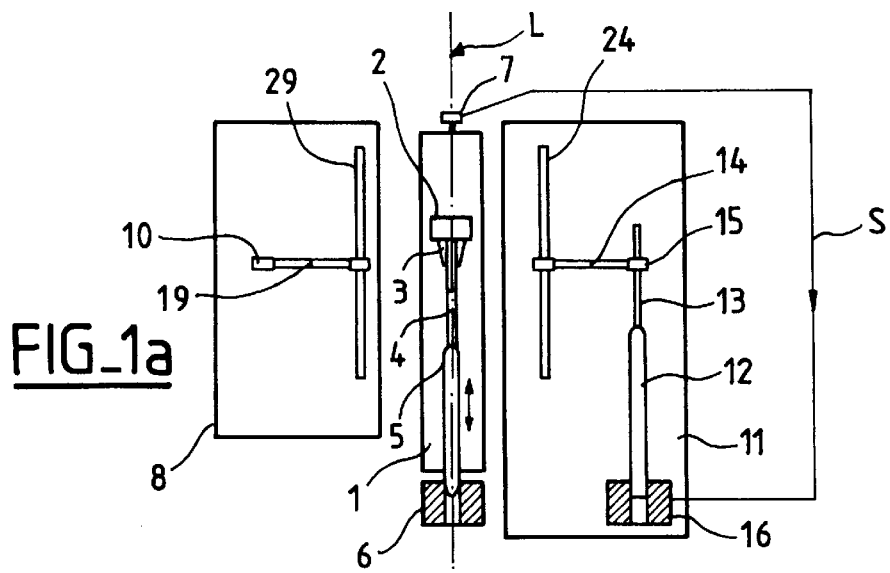
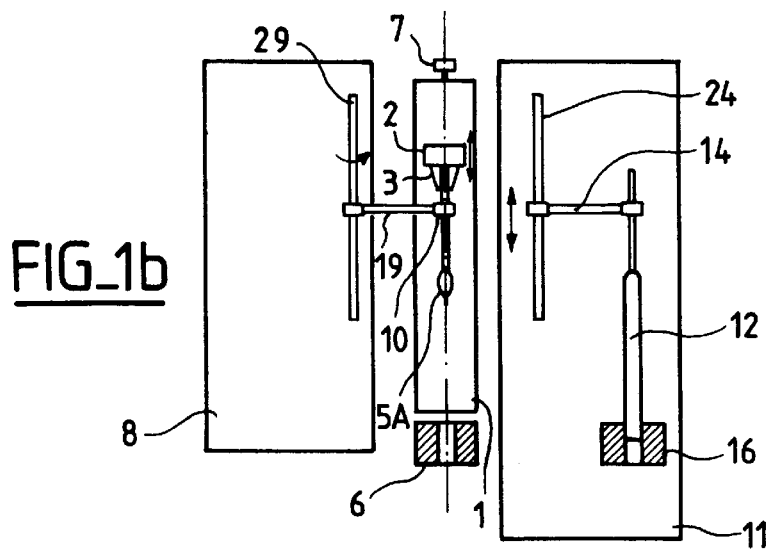
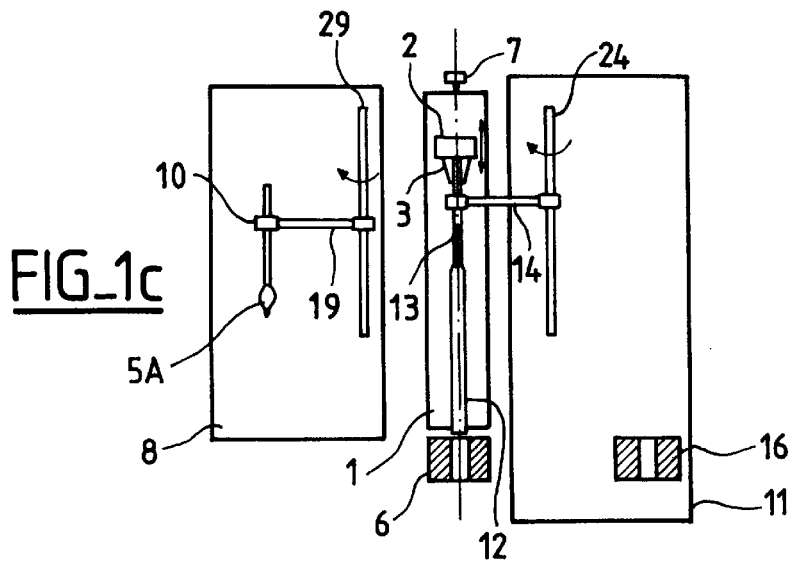

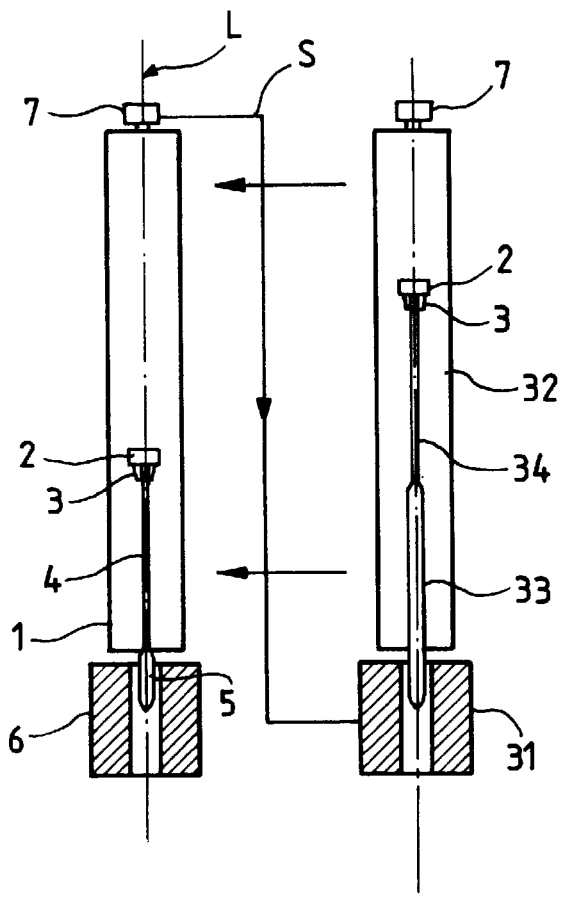
FIG_2a
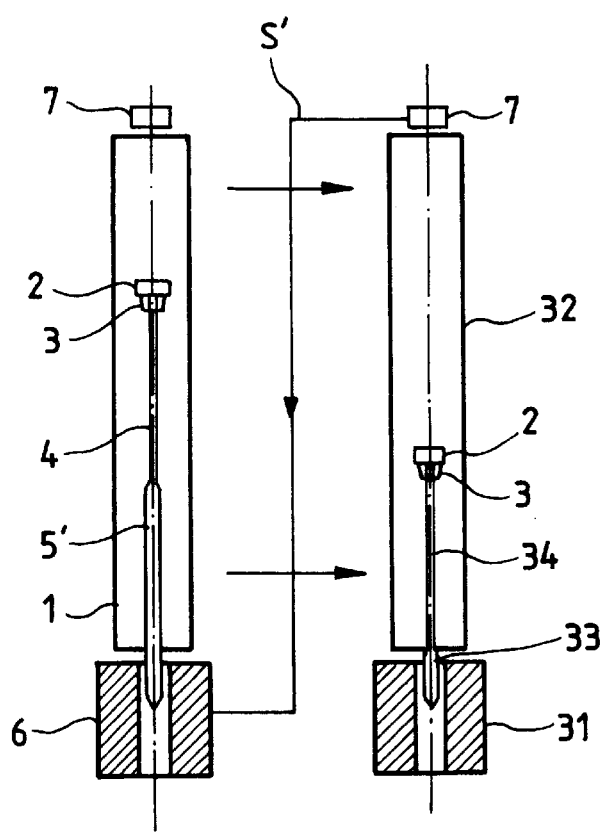
FIG_2b

SEMICONTINUOUS METHOD OF DRAWING FIBERS FROM PREFORMS, THE METHOD INCLUDING A PREHEATING STEP

The present invention relates to a method of drawing an optical fiber in which a first preform is lowered along a fiber-drawing axis through a fiber-drawing oven so as to be heated and drawn down into an optical fiber, and a second preform is lowered along the fiber-drawing axis through the fiber-drawing oven so as to be heated and drawn down in turn after the first preform has been withdrawn.

BACKGROUND OF THE INVENTION

In a method of this type, the first preform is heated by the fiber-drawing oven for a certain length of time so as to be raised to a temperature which is sufficient for drawing a fiber. The time required for raising the temperature of the second preform after the first preform has been removed constitutes dead time between drawing fiber from one of the preforms and then from the other, and that puts a limit on the optical fiber production capacity of the method.

OBJECT AND SUMMARY OF THE INVENTION

The object of the invention is to increase the fiber-drawing capacity of a method of the kind described above.

The invention is based on the idea of preheating the second preform while drawing fiber from the first.

To this end, the invention provides a method of drawing an optical fiber in which a first preform is lowered along a fiber-drawing axis through a fiber-drawing oven so as to be heated and drawn down into an optical fiber, and a second preform is lowered along the fiber-drawing axis through the fiber-drawing oven so as to be heated and drawn down in turn after the first preform has been withdrawn, wherein, while the first preform is being drawn down into a fiber, the second preform is heated in a preheating oven disposed adjacent to the fiber-drawing oven.

The preheating oven makes it possible to raise the second preform to a temperature that is slightly lower than its fiber-drawing temperature, with said preheating being performed while fiber is being drawn from the first preform. The preheating oven is located adjacent to the fiber-drawing oven so that the preheated second preform can be transferred quickly onto the fiber-drawing axis after the first preform has been removed.

In this manner, the time required for raising the preheated second preform to the fiber-drawing temperature is considerably reduced, thereby increasing the production capacity of a method of the invention compared with a known method of the kind described above.

BRIEF DESCRIPTION OF THE DRAWINGS

Other characteristics and advantages of the invention appear on reading the following description of two implementations of the invention as illustrated in the drawings.

FIG. 1a shows a method of the invention implementing a machine for lowering a preform with a fiber-drawing oven, a loading machine with a preheating oven, and an unloading machine.

FIG. 1b shows the end of drawing a fiber from a first preform in a method as shown in FIG. 1a.

FIG. 1c shows a first preform being removed and a preheated second preform being transferred in a method as shown in FIG. 1a.

FIG. 2a shows a method of the invention implementing two preform-lowering machines each associated with a respective oven which alternates between being a fiber-drawing oven and a preheating oven.

FIG. 2b shows how a first preform-lowering machine and a first oven are replaced on a fiber-drawing axis by a second preform-lowering machine and a second oven.

MORE DETAILED DESCRIPTION

In the description below, the same element is given the same reference in the various figures.

In FIG. 1a, a method of drawing optical fibers from preforms comprises a machine 1 for lowering a first preform 5 held by means of a support 4 in a mandrel 3 which is secured to a carriage 2 that is itself movable in translation along a fiber-drawing axis L of the preform-lowering machine. The first preform 5 is lowered by the carriage through a fiber-drawing oven 6 extending along the fiber-drawing axis L so as to be heated and drawn out into an optical fiber which is taken up by a take-up spool (not shown).

At the end of drawing a fiber from the first preform 5, as shown in FIG. 1b, the carriage 2 lifts the unconsumed portion 5A out from the fiber-drawing oven 6. Removal of this residual portion 5A involves the use of an unloading machine 8 having a rod 29 extending parallel to the fiber-drawing axis L and an arm 19 secured to said rod 29 and provided with a holding system 10. The guide rod 29 pivots about its own axis to enable the holding system 10 to take hold of the support 4 of the first preform 5, and then pivots again to place the residual portion 5A in a cooling and manual unloading position as shown in FIG. 1c. The preform-lowering machine can then receive a new preform that is to be heated in the fiber-drawing oven 6 and that is to be drawn down in turn into an optical fiber.

According to the invention, while fiber is being drawn from the first preform, the second preform is heated in a preheating oven located adjacent to the fiber-drawing oven.

In a first implementation of the invention, as shown in FIG. 1a, a preheating oven 16 is integrated with a loading machine 11 comprising a guide rod 24 disposed parallel to the fiber-drawing axis L and an arm 14 fitted with a system 15 for holding a support 13 of the second preform 12. The arm 14 is guided to move in translation along the fiber-drawing axis L by the guide rod 24 so as to lower the second preform into the preheating oven 16.

When the carriage 2 of the preform-lowering machine 1 reaches a position given by an encoder 7, a "start heating" signal S is issued by the encoder 7 to the preheating oven 16 so as to raise the second preform 12 to a temperature that is slightly lower than the fiber-drawing temperature. The power and the preheat time of the preheating oven 16 are determined as a function of the diameter of the second preform so that said temperature is reached at the moment when the first preform 5 is withdrawn from the preform-lowering machine 1.

From this moment, and as shown in FIG. 1b, the arm 14 is guided in translation by the guide rod 24 so as to lift the second preform 12 out from the preheating oven 16, and then as shown in FIG. 1c, the guide rod pivots about its own axis to bring the second preform 12 into position on the fiber-drawing axis L of the preform-lowering machine 1. The preheating oven 16 is located adjacent to the fiber-drawing oven 6 so as to enable the preheated second preform to be transferred quickly to said fiber-drawing oven 6. A preheating temperature close to the fiber-drawing temperature and a rapid transfer make it possible to reduce significantly the amount of time required for heating the second preform after the first has been removed, thereby giving the method of the invention a capacity for producing optical fiber that is greater than that of known methods.

Provision is made in the implementation of the method to use a single machine for unloading the first preform and for loading the second preform, e.g. a machine comprising a travelling crane.

In a second implementation of the invention, a second oven 31 as shown in FIG. 2a is in alignment with a second preform-lowering machine 32 which is of the same type as the preform-lowering machine 1 described above and which is disposed adjacent to said preform-lowering machine.

As in the preceding embodiment, the first preform 5 is lowered by the carriage 2 that is movable in translation along the fiber-drawing axis L through a first oven 6 to be heated and drawn down into an optical fiber that is taken up on a take-up spool (not shown), said first oven being disposed on the fiber-drawing axis together with the first preform-lowering machine and serving as a fiber-drawing oven.

While the first-preform 5 is being drawn down into a fiber, a second preform 33 is installed in the second preform-lowering machine 32 by means of a support 34. When the carriage 2 of the first preform-lowering machine 1 reaches a position specified by the encoder 7, a "start heating" signal S is issued by the encoder 7 to the second oven 31 so as to raise the second preform 33 to a temperature which is slightly lower than the fiber-drawing temperature, said second oven 31 being in alignment with the second preform-lowering machine 32 and serving as a preheating oven.

At the end of fiber drawing from the first preform 5, the assembly constituted by the first preform-lowering machine 1 and the first oven 6 is taken away from the fiber-drawing axis L and is replaced, as shown in FIG. 1b, by the assembly constituted by the second preform-lowering machine 32 and the second oven 31. To replace the first assembly by the second, provision is made, for example, to place the two assemblies on a turret that pivots about an axis parallel to the fiber-drawing axis L.

The second preform 33 is heated and drawn down into a fiber through the second oven 31 which then serves as a fiber-drawing oven. During this time, the first preform 5 is withdrawn, e.g. by means of an unloading machine as described for the first implementation. The first preform-lowering machine 1 is then reloaded with a new preform 5', e.g. by hand. A signal S' issued by the encoder 7 when the carriage 2 reaches a certain position, triggers heating of the first oven 6 to preheat the new preform 5' while the second preform 33 is being drawn down into a fiber, with the first oven 6 then serving as a preheating oven.

In this implementation of the invention, the time required for raising the second preform 33 to fiber-drawing temperature is likewise reduced by the preheating performed while the first preform is being drawn down into a fiber. The preforms are not transferred from one oven to another, with the oven serving in alternation as a fiber-drawing oven and as a preheating oven, thereby eliminating any risk of thermal shock which could always happen in the above-described transfer, even if the transfer is performed quickly. In addition, this embodiment of the invention makes it possible, on each alternation, if necessary, to clean one oven after it has been used as a fiber-drawing oven and before it is used as a preheating oven.

Provision is made to use a single preform-lowering machine with two ovens which alternate between being a fiber-drawing oven and a preheating oven. This variant requires smaller investment because only one preform-lowering machine is required.

What is claimed is:

1. A method of drawing an optical fiber in which a first preform is lowered along a fiber-drawing axis through a fiber-drawing oven so as to be heated and drawn down into an optical fiber, and a second preform is lowered along the fiber-drawing axis through the fiber-drawing oven so as to be heated and drawn down in turn after the first preform has been withdrawn, wherein, while the first preform is being drawn down into a fiber, the second preform is heated in a preheating oven disposed adjacent to the fiber-drawing oven.

2. A fiber-drawing method according to claim 1, in which heating of the preheating oven is triggered by a signal issued by an encoder.

3. A method according to claim 1, in which the first preform is withdrawn from the fiber-drawing axis and the second preform is transferred onto the fiber-drawing axis by means of arms pivoting about rods parallel to the fiber-drawing axis.

4. A method according to claim 1, in which first and second preforms are heated and drawn down into fiber in alternation through first and second ovens each of which acts alternately as a fiber-drawing oven and as a preheating oven.

5. A method according to claim 4, in which the first and second ovens together with first and second preform-lowering machines replace each other in alternation on the fiber-drawing axis.

6. A method of drawing an optical fiber according to claim 1, further comprising the step of transferring the second preform directly from the preheating oven to the fiber-drawing oven after withdrawing the first preform from the fiber-drawing oven.

* * * * *